United States Patent Office 3,654,266
Patented Apr. 4, 1972

3,654,266
INTERMEDIATES FOR PREPARING SEMI-SYNTHETIC PENICILLINS AND METHODS OF PRODUCTION
Charles A. Robinson, West Chester, Pa., assignor to American Home Products Corporation, New York, N.Y.
No Drawing. Filed May 8, 1968, Ser. No. 727,688
Int. Cl. C07d 99/16
U.S. Cl. 260—239.1      20 Claims

ABSTRACT OF THE DISCLOSURE

The new compounds are (a) organosilane derivatives of 6-aminopenicillanic acid, which are prepared by the reaction of 6-aminopenicillanic acid or a salt thereof with a di- or tri-halosilane in the presence of an acid acceptor. Said organosilane derivatives of 6-aminopenicillanic acid are soluble in organic solvents and are readily acylatable with acylating agents to provide new compounds (b) which are organosilane derivatives of penicillins that readily provide, on hydrolysis or alcoholysis, the corresponding penicillins known to have useful antbiotic activity.

---

The present invention relates generally to the art of chemistry and more particularly to the production of (a) novel organosilane derivatives of 6-aminopenicillanic acid, and (b) acylated derivatives of said organosilane derivatives of 6-aminopenicillanic acid, which readily provide, on hydrolysis or alcoholysis, the corresponding penicillins known to have useful antibiotic activity.

Silylated derivatives of 6-aminopenicillanic acid and the use thereof in the preparation of semisynthetic penicillins having antbotic activity are known to the art. For example, mono- and disilylation of 6-aminopenicillanic acid for preparing intermediates which are readily acylated and then hydrolyzed or alcoholyzed to the corresponding penicillins having valuable antibiotic activities have been suggested and/or utilized. For example, there is disclosed by Glombitza in Annalen 673, 166 (1964), and in the patent literature; e.g., in U.S. Pat. No. 3,249,622 and British patent specification Nos. 959,853 and 1,008,468, the preparation of mono- and disilylated derivatives of 6-aminopenicillanic acid, by employing, as silylating agents, monochlorosilanes, aminosilanes, and disilylamines, such as trimethylchlorosilane, trimethylsilylidiethylamine, and hexamethyldisilizane. In none of the prior art exemplified by the noted publication and patents is there any suggestion of the possibility of employing a di- or tri-halosilane, such as a dimethyldichlorosilane or methyltrichlorosilane for the preparation of organosilane derivatives of 6-aminopenicillanic acid. This is because the resulting organosilane derivatives of 6-aminopenicillanic acid were expected to contain reactive Si—Cl or Si—H groups which would interfere with subsequent acylation, or would be polymeric mixtures which are insoluble in solvents and would resist acylation. In any case, failure to use dimethyldichlorosilane per se, for example, was not the result of its non-availability, since it has been widely used in the preparation of "silicones" for many years.

The present invention is based on the discovery that, not only are said di- and tri-halosilanes in fact useable for preparing solvent soluble organosilane derivatives of 6-aminopenicillanic acid, and therefrom, the acylated organosilane products ultimately useful for hydrolysis or alcoholysis to penicillins, but, moreover, result in excellent yields and purity of the final penicillin products. In contrast to the known "silylated" derivatives of 6-amino-penicillanic acid, which are by definition tri-organo substituted, e.g., trimethylsilyl-, derivatives, the products of the present invention are di-organo substituted silane derivatives, and these are herein designated "silenated" derivatives.

Thus, in accordance with the present invention, there are provided a series of new silenated compounds falling within the following generic formula:

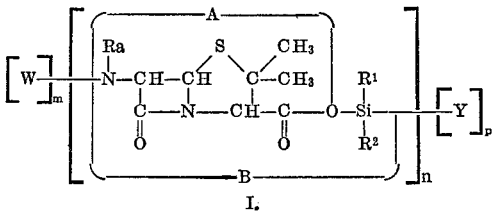

I.

wherein:

$R^1$ is of the group consisting of hydrogen, alkyl, aryl and aralkyl;

$R^2$ is of the group consisting of halogen, alkyl, aryl and aralkyl;

$R^a$ is of the group consisting of hydrogen, and the alkanoyl, aroyl and aralkanoyl residues of organic carboxylic acids;

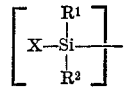

wherein $R^1$ and $R^2$ have the same meaning as before, and X is halogen;

$m$ is an integer from 0 to 1;
$n$ is an integer from 1 to about 25;
$p$ is an integer from 0 to 1; and
$Y$ is of the group consisting of halogen, and groups of the following formula:

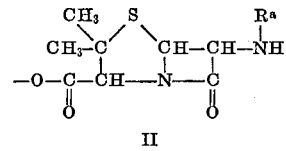

II wherein $R^a$ has the same meaning as before; with the provisos that, in Formula I, (1) when $m$ is 0 and $p$ is 0, $n$ is more than 1;
(2) when $n$ is more than 1, the moieties A of the additional groups B recur in random head-toward-head, head-toward-tail and tail-toward-tail disposition;
(3) when W is hydrogen, $n$ is 1, and Y is Formula II, then $R^a$ is hydrogen; and
(4) $m$ and $p$ are always equal.

The new silenated 6-aminopenicillanic acid derivatives of Formula I, wherein $R^a$ is hydrogen, are prepared by reaction of 6-aminopenicillanic acid, or a salt thereof, preferably with heating in the presence of an acid acceptor, and also preferably in an inert organic solvent, with a di- or tri-halosilane of the following formula:

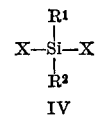

IV wherein $R^1$, $R^2$ and X have the same meanings as in Formula I above, and the reaction is continued until formation of the salt of the respective hydrogen halide is substantially complete or until substantially all 6-aminopenicillanic acid is reacted. Suitable di- or tri-halosilanes including for example, dimethyldichlorosilane, methylpropyldichlorosilane, dimethyldibromosilane, dibutyldichlorosilane, diphenyldichlorosilane, methylphenyldichlorosilane, dibenzyldichlorosilane, ethylbenzyldibromosilane, methyldichlorosilane and methyltrichlorosilane.

In the silenation of 6-aminopenicillanic acid, (hereinafter sometimes referred to as "APA") according to the present invention, various proportions of di- and tri-halosilanes and acid acceptors can be employed to give various novel silenated products which contain a half to two silicon groups per APA group, and in which one or two of the halogen atoms of the di- or tri-halosilane have reacted. For example, the following reactions, wherein

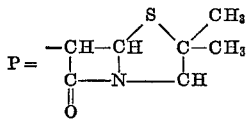

are considered to be involved:

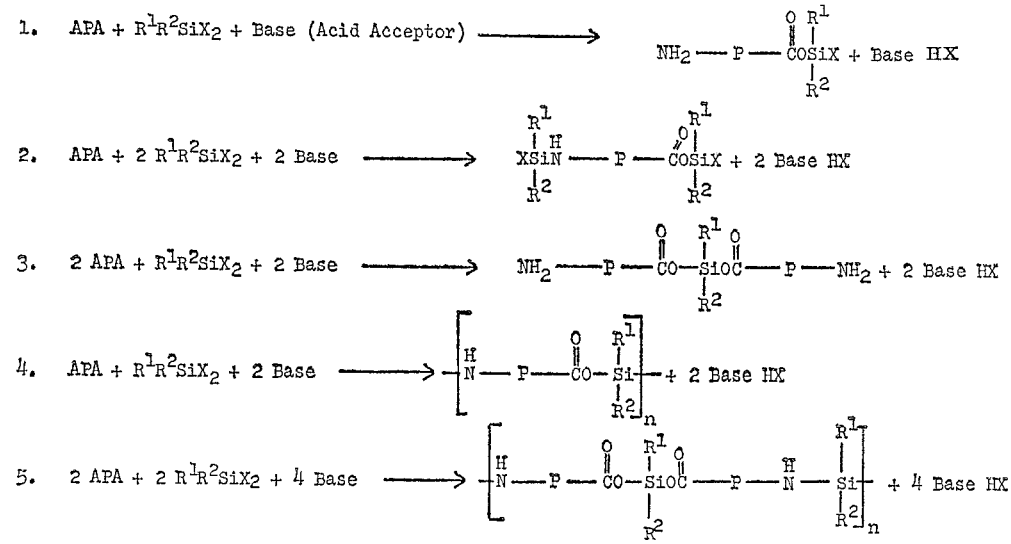

The products containing more than one "P" unit (i.e., wherein $n>1$ in the foregoing formulae) are considered to be linear or cyclic dimers, trimers and the like, or polymers. In such cases, the repeating APA moieties of the group units may be randomly disposed head-toward-tail, head-toward-head and/or tail-toward-tail in a given compound, as will be understood by those skilled in the art and referred to hereinbefore.

Although the products of the invention have been prepared successfully using one-half to two moles of halosilane per mole of APA, it is preferred for maximum efficiency to use approximately equimolar proportions. Suitable acid acceptors include ammonia, organic amines, alkali metal carbonates, alkaline earth metal carbonates and the like. In general, it is preferred to use about two moles of anhydrous ammonia or an amine, such as triethylamine or diethylamine, per mole of halosilane.

For use as solvent media in the silenation of APA to obtain the products of the invention, a wide range of anhydrous non-hydroxylic organic solvents are suitable, including hydrocarbons, such as benzene and toluene; chlorinated solvents such as methylene chloride, chloroform, ethylene dichloride and chlorobenzene; ethers such as diethyl ether, dioxane and tetrahydrofuran; and other conventional solvents such as methylisobutylketone, dimethylformamide, ethyl acetate and acetonitrile.

Among these solvents, methylene chloride, chloroform, acetonitrile, and ethyl acetate are particularly useful. Since the halosilanes and silenated products are decomposed by moisture and other hydroxylic agents, solvents employed as reaction media must be substantially anhydrous and free from alcoholic impurities. Although more than 30 ml. of solvent per g. of APA has been used successfully for the silenation reaction, the use of 10 ml. per g. is usually sufficient. In some instances, however, the use of high dilution will favor intramolecular reaction and silenated derivatives of lower molecular weight, while a high concentration of reactants will favor intermolecular reaction and higher molecular weight products.

The reaction between APA and a di- or tri-halosilane is carried out preferably at a temperature at which the reaction proceeds to completion in a reasonably short time, for example, between 10° C. and the boiling point of the solvent media. In refluxing methylene chloride, for example, the reaction of one mole of APA with one mole of dimethyldichlorosilane in the presence of two moles of triethylamine is complete in three hours, whereas after only one hour, about 4% of the APA remains unreacted. Complete solubility of the APA used as a starting material and a quantitative yield of triethylamine hydrochloride are indicative of complete reaction.

The silenated 6-aminopenicillanic acid derivatives prepared according to this invention can be isolated by removing the base hydrohalide by filtration and distillation of the solvent, or if these intermediates are to be converted at once to a penicillin, the reaction mixture can be acylated directly without filtration or concentration. The new silenated derivatives of APA are readily soluble in a wide selection of anhydrous, non-hydroxylic solvents such as methylene chloride, chloroform, carbon tetrachloride, ethyl acetate, tetrahydrofuran, dioxane, benzene, toluene, dimethylsulfoxide, dimethylacetamide, dimethylformamide, acetonitrile, acetone, and methylisobutylketone, but are largely insoluble in hexane and cyclohexane. The β-lactam ring of the silenated derivatives is shown to be intact by infrared analysis as well as by the recovery of high purity APA on treatment with water or an alcohol. For silenated products obtained using the reaction proportions given in Reactions 4 and 5 above, NMR studies and elemental analysis indicate a 1:1 ratio of Si to APA nucleus and absence of halogen, which is consistent with the structures shown for the products of these reactions.

The new acylated organosilane derivatives of APA of Formula I wherein $R^a$ is an acyl group, are prepared by reaction of the silenated APA intermediates with a suitable reactive derivative of an organic carboxylic acid in the presence of an acid acceptor. As will be known to those skilled in the art, the reactive derivative may be that of a suitable organic sulfonic acid instead of an organic carboxylic acid. The ultimate penicillins are obtained by hydrolysis or alcoholysis of these acylated derivatives to the penicillin per se. Suitable acylating agents include carboxylic acid halides, carboxylic acid anhydrides, mixed anhydrides with other carboxylic or inorganic acids, esters such as thiol esters and phenolic esters, lactones, and carboxylic acids with carbodiimides or N,N'-carbonyldiimidazoles. For the preparation of aminopenicillins, amino acid chloride hydrochlorides and amino acid N-carboxyanhydrides are suitable for acylating the APA derivatives.

Although not limited thereto, silenated penicillin derivatives of particular interest are those of Formula I wherein $R^a$ is of the group consisting of those groups having one of the following formulae:

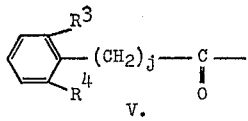

V.

wherein $R^3$ and $R^4$ are of the group consisting of hydrogen and lower alkoxy; and $j$ is an integer from 0 to 1;

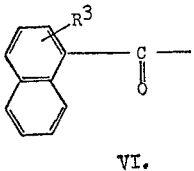

VI.

wherein $R^3$ has the same meaning as in Formula V above:

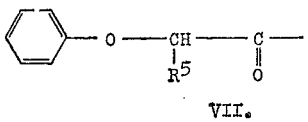

VII.

wherein $R^5$ is of the group consisting of hydrogen, lower alkyl and phenyl;

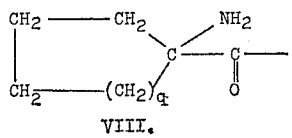

VIII.

wherein $q$ is an integer from 1 to 5;

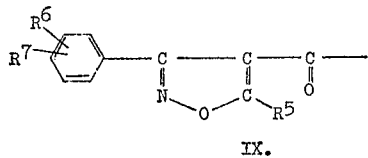

IX.

wherein $R^5$ has the same meaning as in Formula VII above, and $R^6$ and $R^7$ are of the group consisting of hydrogen and halogen;

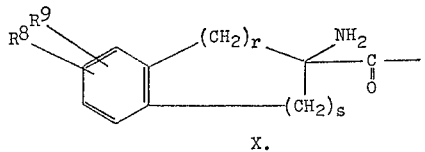

X.

wherein $R^8$ and $R^9$ are of the group consisting of hydrogen, lower alkyl, alkoxy, phenyl and phenoxy; $r$ is an integer from 0 to 1, and $s$ is an integer from 1 to 3, with the provisos that when $r$ is 0, $s$ is greater than 1, and when $r$ is 1, $s$ is less than 3; and

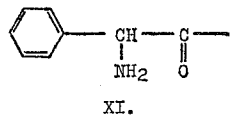

XI.

Illustrative of some of the specific preferred acylating agents which may be used are the following: phenoxyacetyl chloride, 2,6-dimethoxybenzoyl chloride, benzenesulfonyl chloride, 2-phenoxypropionyl chloride, 2-phenoxybutyryl chloride, D(—)phenylglycyl chloride HCl, 1-aminocyclopentanecarboxylic acid chloride HCl, 1-aminocyclohexanecarboxylic acid chloride HCl, 2-amino-2-carboxyindane acid chloride HCl, 2-ethoxynaphthoyl bromide and 3-(2,6-dichlorophenyl)-5-methylisoazole-4-carbonyl chloride.

The acylation reaction is carried out preferably in the presence of an acid acceptor which may be the same as or different from the one employed in preparing the silenated intermediate. For example, although a tertiary amine such as triethylamine is suitable for both reactions, the use of a weaker base such as N,N-dimethylaniline, pyridine, or quinoline, for the acylation reaction often affords higher yields. In the preparation of α-amino penicillins acylation with α-amino acid halide hydrohalides is best carried out in the absence of any strong base such as the alkyl amines. In fact, it is preferred to inactivate any excess strong amine, if present, by addition of a mineral acid salt of a weak amine. For example, using one mole of dimethyldichlorosilane and an excess (e.g., 2.3 moles) of triethylamine in the silylation of one mole of 6-aminopenicillanic acid, the addition of 0.4 equivalent of dimethylaniline·2HCl prior to acylation with phenylglycyl chloride HCl increased the overall yield of anhydrous ampicillin from 70 to 83% of theory.

In general, the same types of solvents are useful for the acylation of the silenated 6-APA products as for their original preparation. The silenated penicillins of the present invention are readily hydrolyzed or alcoholyzed by treating with water or other hydroxy-containing compound, e.g., an alcohol such as methyl or ethyl alcohol, to form the corresponding penicillins.

The following examples are illustrative of the invention, but are not to be considered as necessarily limitative thereof:

EXAMPLE 1

In a 1 liter, 3-neck flask fitted with stirrer, thermometer, and drying tube, 40.5 g. (0.40 mole) of triethylamine was added to a mixture of 43.2 g. (0.20 mole) of 6-aminopenicillanic acid (APA) and 425 ml. of dry acetonitrile under a nitrogen atmosphere. At 10–15° C., 25.8 g. (0.20 mole) of dimethyldichlorosilane was added dropwise, and then the mixture was stirred at 45° C. for one hour. After cooling to 15° C., the insoluble material was removed by filtration, washed with acetonitrile, and dried; weight 48.3 g. or 88% of theory for triethylamine hydrochloride. Complete water-solubility showed absence of unreacted APA.

The clear, pale yellow filtrate was poured into 500 ml. of ice-water and adjusted to pH 3.9 with 1 ml. of 2.5 N HCl. After stirring for one-half hour, the white, crystalline APA was recovered by filtration and washed with water and finally with acetone; dry weight, 40.5 g. or 94% of that used as starting material; iodometric assay, 998 mcg. per mg.

EXAMPLE 2

When the procedure of Example 1 was followed, substituting other anhydrous organic solvents for acetonitrile, soluble silenated derivatives of APA were obtained as shown by regeneration of APA from the solutions as illustrated below:

| Solvent used | Reaction time, hours | Recovery of APA, percent |
|---|---|---|
| Methylene chloride | 3 | 93 |
| Chloroform (alcohol-free) | 1 | 85 |
| Ethylacetate | 2 | 82 |
| Dioxane | 1 | 62 |
| Methylisobutyl ketone | 1 | 77 |

Likewise, using dimethylformamide, tetrahydrofuran, and benzene as reaction media, APA was recovered.

EXAMPLE 3

A mixture of 43.2 g. of APA, 425 ml. of methylene chloride and 40.5 g. of triethylamine, was treated with 25.8 g. of dimethyldichlorosilane at 10–15° C. and the mixture refluxed gently for two hours. An indicator showed that no free triethylamine remained. After stirring at 5–10° C. for one-half hour, the insoluble by-products were removed by filtration, washed with methylene chloride and dried. Of the 44.0 g. obtained only 0.4 g. was unreacted APA.

After precipitating additional triethylamino hydrochloride by adding 250 ml. of ether anhydrous and filtering, the filtrate was concentrated to dryness under reduced pressure at 25° C. The residue, 57.3 g., was freed of remaining triethylamine hydrochloride by dissolving in 290 ml. of dry ethyl acetate, filtering and re-concentrating to constant weight, 54.5 g. or 100% theory. The total amount of triethylamine hydrochloride recovered was 53.9 g. or 98% of theory. The product was a pale yellow, friable solid with a chlorine content of 0.08%.

Calculated for $C_{10}H_{16}N_2O_3SSi$ (percent): C, 44.09; H, 5.92; N, 10.29. Found (percent): C, 42.93; H, 6.29; N, 9.60.

This silenated APA was completely soluble at 20° C. in anhydrous solvents such as methylene chloride, chloroform, carbon tetrachloride, ethylene dichloride, ethylacetate, tetrahydrofuran, dioxane, benzene, toluene, dimethylsulfoxide, dimethylacetamide, dimethylformamide and acetonitrile, but largely insoluble in hexane and cyclohexane.

On treating a solution of 5.0 g. of this dimethylsilane derivative in 50 ml. of dry ethyl acetate at 5° C. with 2.5 ml. of ethyl alcohol, APA crystallized, recovery 3.5 g. representing 88% of the APA used as starting material; iodometric assay, 884 mcg. per mg.

EXAMPLE 4

By a procedure similar to Example 1, a mixture of 21.6 g. (0.10 mole) of APA, 213 ml. of methylene chloride, and 20.3 g. (0.20 mole) of triethylamine was treated with 15.7 g. (0.10 mole) of methylpropyldichlorosilane with cooling. After refluxing gently for two hours and cooling to 15° C., the insoluble material was removed by filtration and washed with methylene chloride. Solubilization of the triethylamine hydrochloride by stirring in water left 0.4 g. of unreacted APA.

Regeneration of APA from the clear, pale yellow methylene chloride solution by pouring into water, filtration and washing the white product with acetone, afforded 18.8 g. of APA or 87% recovery; iodometric assay, 993 mcg. per mg.

EXAMPLE 5

When the procedure of Example 4 was followed substituting equimolar amounts of other halosilanes in place of methylpropyldichlorosilane, soluble derivatives of APA were obtained as shown by regeneration from the solution as illustrated below:

| Halosilane used | Reaction time, hours | Recovery of ABA, percent |
|---|---|---|
| Methyldichlorosilane | 1 | 84 |
| Phenylmethyldichlorosilane | 2 | 88 |
| Methyltrichlorosilane | 1 | 52 |
| Diphenyldichlorosilane | 3 | 78 |

EXAMPLE 6

Diphenyldichlorosilane, 25.3 g. (0.10 mole), was added dropwise at 10–15° C. to a mixture of 21.6 g. of APA, 213 ml. of methylene chloride and 20.3 g. of triethylamine, and the mixture was allowed to reflux for three hours. After cooling to 10° C., the insoluble by-product was removed by filtration and washed with methylene chloride. Removal of triethylamine hydrochloride from the dried solid by solubilization in cold water left 1.6 g. of unreacted APA.

The clear methylene chloride solution was concentrated to dryness under reduced pressure at 20–25° C. The residue, 46.0 g., was freed of triethylamine hydrochloride by dissolving in 200 ml. of dry ethyl acetate, filtering and reconcentrating to constant weight, 39.4 g. This product was a pale yellow, friable solid with a chlorine content of 0.33%.

Calculated for $C_{20}H_{20}N_2OSSi$ (percent): C, 60.58; H, 5.08; N, 7.07. Found (percent): C, 59.77; H, 5.41; N, 6.10.

The product was soluble at 20° C. in anhydrous solvents including $CH_2Cl_2$, tetrahydrofuran, acetone, benzene and dimethylformamide.

On treating a solution of 10.0 g. of this silenated APA derivative in 50 ml. of methylene chloride with 50 ml. of cold water, APA crystallized; recovery 3.75 g. corresponding to 72% from the APA used as a starting material; iodometric assay, 976 mcg. per mg.

EXAMPLE 7

Dicloxacillin (acid)

A methylene chloride solution of silenated APA was prepared from 0.20 mole of APA and dimethyldichlorosilane as described in Example 3. After removing triethylamine hydrochloride by filtration, the filtrate was treated with 26.7 g. (0.22 mole) of N,N-dimethylaniline, and then a solution of 58.2 g. (0.20 mole) of 3-(2,6-dichlorophenyl)-5-methylisoxazole-4-carbonyl chloride in 75 ml. of methylene chloride was added at 0° C. over 15 minutes. The mixture was allowed to warm to room temperature and stirred for an additional hour.

After pouring the reaction mixture into 500 ml. of cold water and separating the layers, 700 ml. of hexane was added to the methylene chloride phase and crystallization was allowed to proceed for 16 hours at 5° C. The resulting dichloxacillin (acid), after drying, amounted to 79.4 g. or 84% of theory; bioassay, 885 mcg. per mg.

EXAMPLE 8

Nafcillin (acid)

A methylene chloride solution of silenated APA was prepared from 0.20 mole of APA as described in Example 3. After removing triethylamine hydrochloride by filtration, the filtrate was treated with 26.7 g. of N,N-dimethylaniline, and then 47.5 g. (0.202 mole) of 2-ethoxynaphthoyl chloride was added portionwise over 20 minutes at 0° C.

After stirring at 20° C. for two hours, the reaction mixture was poured into a mixture of 210 ml. of water and 78 g. of ice. Dilute sodium hydroxide was added to pH 10 and the layers were allowed to separate. The methylene chloride phase was reextracted twice with 150 ml. of water at pH 10. After acidifying the combined aqueous layers to pH 2.9 with dilute sulfuric acid in the presence of 40 ml. of methylisobutylketone, crystallization was allowed to proceed with stirring at 5° C. overnight. The product was collected by filtration, washed thoroughly with methylisobutylketone, then with water, and dried; yield, 61.4 g. or 74% of theory; bioassay, 924 mcg. per mg.

EXAMPLE 9

Ampicillin

A methylene chloride solution of silenated APA was prepared from 0.20 mole of APA as described in Example 3. Without removing triethylamine hydrochloride by filtration, the mixture was treated wtih 26.7 g. of N,N-dimethylaniline, and then 41.9 g. (0.203 mole) of D(—) phenylglycyl chloride hydrochloride was added portionwise over 20 minutes at 0° C. and then allowed to warm to 20° C. and to stir at that temperature for 15 minutes. After pouring the reaction mixture into 1200 ml. of cold water with stirring, the resulting two-phase solution (pH 1.8) was clarified by filtration and 150 ml. of ethylacetate was added to the filtrate.

To this mixture at 5–10° C., a solution of β-naphthalenesulfonic acid containing 52 g. (0.25 mole) of active agent was added dropwise while adding dilute sodium hydroxide solution concurrently to maintain a pH of 1.5–1.7. After stirring overnight, the white crystalline product was collected by filtration and washed thoroughly wtih cold water and finally with ethyl acetate. A sample of the wet filter cake dried in a vacuum oven at 50–60° C. showed the wet filter cake to contain 106 g. of the β-naphthalene sulfonic acid salt of ampicillin or 95% of theory based on APA.

The wet filter cake was heated in a mixture of 220 ml. of isopropanol and 19.4 g. of triethylamine at 70–78° C. for 15 minutes, filtered, and the product washed with 85% isopropanol. The yield of dried ampicillin anhydrous amounted to 58.0 g. or 83% of theory from APA; iodometric assay, 1010 mcg. per mg.; bioassay, 1015 mcg. per mg.

Comparable results were obtained when the N,N-dimethylaniline was added prior to the addition of dimethyldichlorosilane and the reaction time at reflux was reduced to one hour.

In other analogous experiments, ampicillin was prepared when the quantity of dimethyldichlorosilane was decreased to 14.2 g. (0.11 mole) and increased to 51.7 g. (0.40 mole) and when the triethylamine was replaced by 2,2'-diethyldihexylamine.

EXAMPLE 10

Ampicillin

To 580 ml. of methylene chloride containing 0.43 mole of anhydrous ammonia, 43.2 g. of APA and 26.7 g. of N,N-dimethylaniline were added followed by the dropwise addition of 25.8 g. of dimethyldichlorosilane at 12° C. After refluxing gently for one hour, the mixture was cooled to 10° C., under nitrogen, and 13 ml. of 3.1 N solution of dimethylaniline dihydrochloride in methylene chloride was added to inactivate excess ammonia.

At 0° C., 41.9 g. of D(—)phenylglycyl chloride hydrochloride was added portionwise over 20 minutes. After stirring at 10° C. for an additional 15 minutes, the reaction mixture was poured into 1200 ml. of ice-water and converted to ampicillin anhydrous as described in Example 9; yield, 80% of theory; bioassay, 987 mcg. per mg.

EXAMPLE 11

6-(1-aminocyclohexanecarboxamido)Penicillanic acid

A methylene chloride solution of silenated APA was prepared from 0.20 mole of APA as described in Example 3. Without removing triethylamine hydrochloride by filtration, the mixture was treated with 16.6 g. of pyridine, and then 40.7 g. (0.205 mole) of 1-amino-1-cyclohexanecarboxylic acid chloride hydrochloride was added portionwise over 20 minutes at 0° C. After stirring at 0° C. and finally at 20° C. for one hour, the reaction mixture was poured into 400 ml. of water, clarified by filtration, and adjusted to pH 5.4 by adding dilute sodium hydroxide solution.

After stirring overnight at 20° C., the product was collected by filtration, washed and dried; yield as dihydrate was 59.0 g. or 78% of theory; purity 95% by iodometric assay.

EXAMPLE 12

Penicillin V

A methylene chloride solution of silenated APA was prepared from 0.10 mole of APA and methylpropyldichlorosilane as described in Example 4. After removing triethylamine hydrochloride, the pale yellow filtrate was treated with 13.4 g. of N,N-dimethylaniline, and then a solution of 17.0 g. (0.10 mole) of phenoxyacetal chloride in 50 ml. of methylene chloride was added at 0° C. over 20 minutes. The mixture was allowed to stir at 20° C. for 1½ hours.

After pouring the clear, red solution into 400 ml. of ice-water containing 40 g. of sodium bicarbonate, the layers were separated, and the methylene chloride layer re-extracted with water. Acidification of the aqueous phase with dilute hydrochloric acid, finally to pH 1.8, afforded nearly colorless crystals; yield, 29.5 g. or 84% of theory; bioassay 890 mcg. per mg.

EXAMPLE 13

6-(2-amino-2-indancarboxamido)penicillanic acid

A methylene chloride solution of silenated APA was prepared from 0.10 mole of APA as described in Example 3. After removing triethylamine hydrochloride by filtration, 13.4 g. of N,N-dimethylaniline was added to the filtrate followed by the addition of 24.2 g. (0.104 mole) of 2-amino-2-carboxyindane acid chloride hydrochloride in small portions over 20 minutes at 0° C. The mixture was allowed to warm to room temperature and stir for an additional 15 minutes.

After pouring the amber solution into 200 ml. of ice-water and filtering the mixture, the filtrate was adjusted to pH 5.8 with dilute sodium hydroxide solution. After stirring for 16 hours, the white product was collected by filtration, washed with water and acetone, and then dried; yield, 18.6 g. or 50% of theory. The purity was 96% as determined by iodometric assay.

EXAMPLE 14

Dicloxacillin (acid)

Substituting 38.2 g. (0.20 mole) of phenylmethyldichlorosilane for dimethyldichlorosilane in the procedure of Example 7, dicloxacillin (acid) was obtained in 79% yield.

EXAMPLE 15

Ampicillin

Substituting 23.0 g. (0.20 mole) of methyldichlorosilane ($CH_3SiHCl_2$) for dimethyldichlorosilane in the procedure of Example 9, 48.0 g. of ampicillin anhydrous, corresponding to 69% of theory, was obtained, iodometric assay, 1004 mcg. per mg.

EXAMPLE 16

Following the procedure of Example 7, a series of silenated penicillin derivatives are prepared, and from them the corresponding penicillins per se by substituting, for the 3-(2,6-dichlorophenyl)-5-methylisooxazole-4-carbonyl chloride as acylating agent, equivalent amounts of the acylating agents set forth in Table A below:

TABLE A

Acylating agents used:

| Acylating agent | Final penicillins obtained |
|---|---|
| 2,6-dimethoxybenzoyl chloride. | |
| Benzene sulfonyl chloride. | Methicillin. 6-(benzene sulfonyl amino) penicillanic acid. |
| 2-phenoxy propionyl chloride. | Phenethicillin. |
| 2-phenoxy butyryl chloride. | Propicillin. |

EXAMPLE 17

Following the procedure of Example 11, but substituting for 1-aminocyclohexane carboxylic acid chloride hydrochloride as acylating agent, equivalent amounts of other acylating agents, a series of penicillin derivatives, and therefrom the corresponding penicillins, are obtained as set forth in Table B below:

TABLE B

| Acylating agents used | Final penicillins |
|---|---|
| 1-aminocyclopentanecarboxylic acid chloride HCl. | 6-(1-aminocyclopentanecarboxamido)penicillanic acid. |
| 2-amino-1,2,3,4-tetrahydro-6-methoxy-2-naphthoic acid chloride HCl. | 6-(2-amino-1,2,3,4-tetrahydro-6-methoxy-2-naphthamido)penicillanic acid. |
| 2-amino-1,2,3,4-tetrahydro-7-ethoxy-2-naphthoic acid chloride HCl. | 6-(2-amino-1,2,3,4-tetrahydro-7-ethoxy-2-naphthamido)penicillanic acid. |
| 2-amino-4-phenyl-2-indancarboxylic acid chloride HCl. | 6-(indan-2-amino-4-phenyl-2-carboxamido)penicillanic acid. |
| 2-amino-3-phenoxy-2-indan carboxylic acid chloride HCl. | 6-(indan-2-amino-3-phenoxy-2-carboxamido)penicillanic acid. |
| 2-amino-4-butyl-2-indan carboxylic acid chloride HCl. | 6-(indan-2-amino-4-butyl-2-carboxamido)penicillanic acid. |
| 1-amino-7-methyl-1-indan carboxylic acid chloride HCl. | 6-(indan-1-amino-7-methyl-1-carboxamido)penicillanic acid. |

I claim:

1. A compound of the group consisting of those having the following formula:

[Formula I]

wherein:

$R^1$ is of the group consisting of hydrogen, lower alkyl, phenyl, lower alkylphenyl and benzyl;

$R^2$ is of the group consisting of halo, lower alkyl, phenyl, lower alkylphenyl and benzyl;

$R^a$ is of the group consisting of hydrogen, and those having the following formulae:

[Formula V]

wherein $R^3$ and $R^4$ are of the group consisting of hydrogen and lower alkoxy; and $j$ is an integer from 0 to 1;

[Formula VI]

wherein $R^3$ has the same meaning as in Formula V above;

[Formula VII]

wherein $R^5$ is of the group consisting of hydrogen and phenyl;

[Formula VIII]

wherein $q$ is an integer from 1 to 5;

[Formula IX]

wherein $R^5$ has the same meanings as in Formula VII. above, and $R^6$ and $R^7$ are of the group consisting of halogen;

[Formula X]

wherein $R^8$ and $R^9$ are of the group consisting of hydrogen, lower alkyl, lower alkoxy, phenyl and phenoxy; $r$ is an integer from 0 to 1, and $s$ is an integer from 1 to 3, with the provisos that when $r$ is 0, $s$ is greater than 1, and when $r$ is 1, $s$ is less than 3; and

[Formula XI]

W is of the group consisting of hydrogen and

[Formula with Si]

wherein $R^1$ and $R^2$ have the same meaning as before, and X is halogen;

$m$ is an integer from 0 to 1;

$n$ is an integer from 1 to about 25;

$p$ is an integer from 0 to 1;

Y is of the group consisting of halogen and groups of the following formula:

[Formula II]

wherein $R^a$ has the same meaning as before; with the provisos that, in Formula I., (1) when $m$ is 0 and $p$ is 0, $n$ is more than 1;
(2) when $n$ is more than 1, the moieties A of the additional groups B recur in random head-toward-head, head-toward-tail and tail-toward-tail disposition;
(3) when W is hydrogen, $n$ is 1, and Y is Formula II, then $R^a$ is hydrogen;
(4) $m$ is always equal to $p$ and
(5) when $R^a$ is hydrogen and $R^1$ is other than hydrogen, $R^2$ is halo.

2. A compound as defined in claim 1, wherein $R^a$ is hydrogen; and
$m$ and $p$ are both 0.

3. A compound as defined in claim 1, wherein

W is hydrogen;
$m$ is 1;
$p$ is 1; and
Y is Formula II.

4. A compound as defined in claim 1, wherein

W is

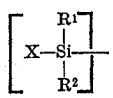

m is 1;
p is 1; and
Y is X.

5. A compound as defined in claim 1 wherein $R^1$ is hydrogen and $R^2$ is other than halo; and
$R^a$ is of the group consisting of those having the following formulae:

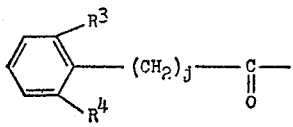

V.

wherein $R^3$ and $R^4$ are of the group consisting of hydrogen and lower alkoxy; and j is an integer from 0 to 1;

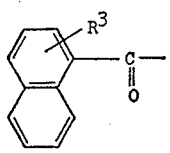

VI.

wherein $R^3$ has the same meaning as in Formula V above;

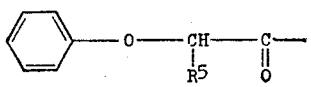

VII.

wherein $R^5$ is of the group consisting of hydrogen, lower alkyl and phenyl;

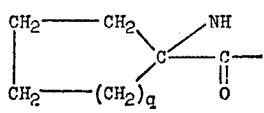

VIII.

wherein q is an integer from 1 to 5;

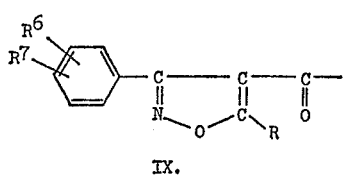

IX.

wherein $R^5$ has the same meaning as in Formula VII above, and $R^6$ and $R^7$ are of the group consisting of hydrogen and halogen;

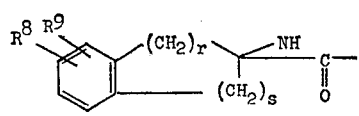

X.

wherein $R^8$ and $R^9$ are of the group consisting of hydrogen, lower alkyl, lower alkoxy, phenyl and phenoxy; r is an integer from 0 to 1, and s is an integer from 1 to 3, with the provisos that when r is 0, s is greater than 1, and when r is 1, s is less than 3; and

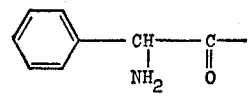

XI.

6. A compound as defined in claim 1, wherein $R^a$ is of the formula:

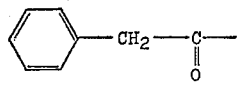

7. A compound as defined in claim 1, wherein $R^a$ is of the formula:

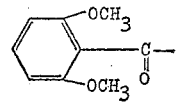

8. A compound as defined in claim 1, wherein $R^a$ is of the formula:

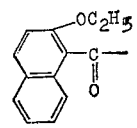

9. A compound as defined in claim 1, wherein $R^a$ is of the formula:

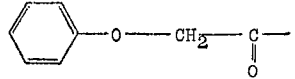

10. A compound as defined in claim 1, wherein $R^a$ is of the formula:

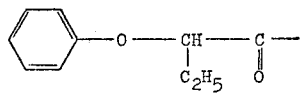

11. A compound as defined in claim 1, wherein $R^a$ is of the formula:

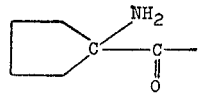

12. A compound as defined in claim 1, wherein $R^a$ is of the formula:

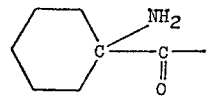

13. A compound as defined in claim 1, wherein $R^a$ is of the formula:

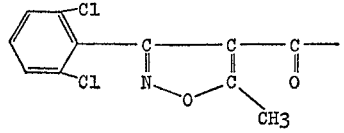

14. A compound as defined in claim 1, wherein $R^a$ is of the formula:

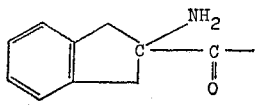

15. A compound as defined in claim 1, wherein $R^a$ is of the formula:

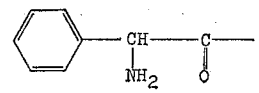

16. A process for preparing organosilane derivatives of 6-aminopenicillanic acid, which process comprises: reacting 6-aminopencillanic acid with a di- or trihalosilane of the following formula:

wherein:

R¹ is of the group consisting of lower alkyl, phenyl and lower alkylphenyl;

R² is of the group consisting of hydrogen, halogen, lower alkyl, phenyl and lower alkylphenyl; and X is halogen;

in an anhydrous non-hydroxylic organic solvent in the presence of an acid acceptor; and wherein:
the mole proportions of each of said 6-aminopenicillanic acid, said di- or tri-halosilane, and said acid acceptor are from 1 to 2.

17. A process for preparing organosilane derivatives of 6-aminopenicillanic acid, as claimed in claim 16, wherein the organosilane derivative obtained is acylated by a reactive derivative of an organic carboxylic acid, in an anhydrous non-hydroxylic organic solvent.

18. A process for preparing a penicillin which comprises subjecting the organosilane derivative of 6-aminopenicillanic acid obtained by the process of claim 17, to a treatment selected from the group consisting of hydrolysis and alcoholysis to obtain the corresponding penicillin.

19. A process for preparing an organosilane derivative of 6-aminopenicillanic acid as defined in claim 17, wherein the acylating agent comprises a group selected from the following groups:

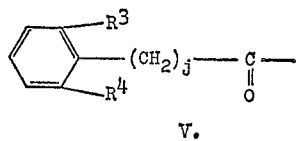

wherein R³ and R⁴ are of the group consisting of hydrogen and lower alkoxy; and $j$ is an integer from 0 to 1;

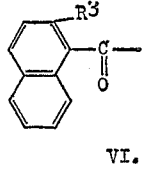

wherein R³ has the same meaning as in Formula V above;

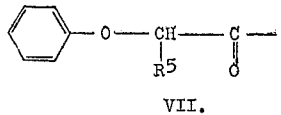

wherein R⁵ is of the group consisting of hydrogen and phenyl;

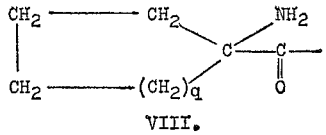

wherein $q$ is an integer from 1 to 5;

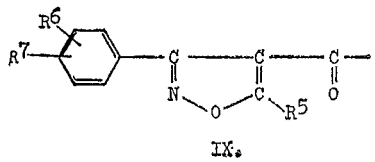

wherein R⁵ has the same meaning as in Formula VII above, and R⁶ and R⁷ are of the group consisting of hydrogen and halogen;

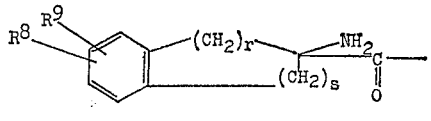

wherein R⁸ and R⁹ are of the group consisting of hydrogen, lower alkyl, lower alkoxy, phenyl and phenoxy, $r$ is an integer from 0 to 1, and $s$ is an integer from 1 to 3, with the provisos that when $r$ is 0, $s$ is greater than 1, and when $r$ is 1, $s$ is less than 3; and

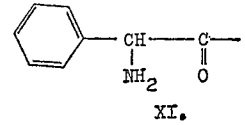

20. A process for preparing organosilane derivatives of 6-aminopenicillanic acid, which process comprises: reacting 6-aminopenicillanic acid with a dihalosilane of the following formula:

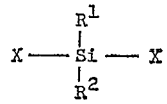

wherein:

R¹ is of the group consisting of hydrogen, lower alkyl, phenyl and lower alkylphenyl;

R² is of the group consisting of lower alkyl, phenyl and lower alkylphenyl; and

X is halogen in an anhydrous non-hydroxylic organic solvent in the presence of an acid acceptor; and acylating the organosilane derivative obtained, again in an anhydrous non-hydroxylic organic solvent, with a reactive derivative of an organic carboxylic acid selected from those containing one of the following groups:

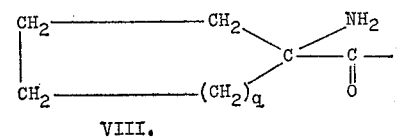

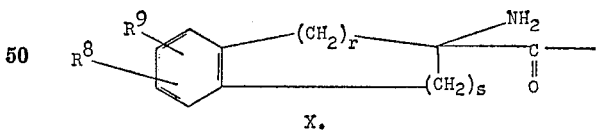

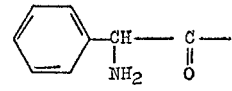

and wherein:
the mole proportions of each of said 6-aminopenicillanic acid, said di- or tri-halosilane, and said acid acceptor are from 1 to 2.

References Cited

UNITED STATES PATENTS 3,249,622   5/1966   Herrling et al. _____ 260—239.1

FOREIGN PATENTS 959,853     6/1964   Great Britain _____ 260—239.1
1,008,468  10/1965   Great Britain _____ 260—239.1

NICHOLAS S. RIZZO, Primary Examiner

U.S. Cl. X.R.

260—306.7

PO-1050
(5/69)

UNITED STATES PATENT OFFICE
CERTIFICATE OF CORRECTION

Patent No. 3,654,266                    Dated April 4, 1972

Inventor(s) Charles A. Robinson

It is certified that error appears in the above-identified patent and that said Letters Patent are hereby corrected as shown below:

Column 1, line 48, "silyli̱diethylamine" should read -- silyldiethylamine --.

Column 2, line 10, in the formula I, the right hand portion of the bracket "A", which presently extends directly to the oxygen atom representation, "-O-", should instead extend between the oxygen and silicon atom representations designated by "-O-" and "-Si-", respectively, so that the portion of the formula in question should appear as follows:

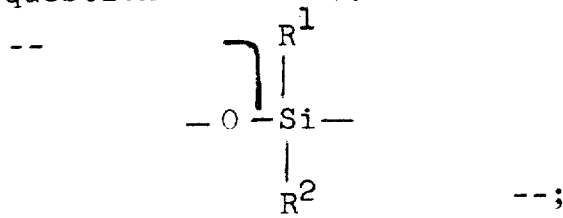

between lines 24 and 25, there should appear the phrase; -- W is of the group consisting of hydrogen; and --.

Column 6, line 4, "-5-methylisoazole" should read -- -5-methylisoxazole.--

Column 7, line 65, the extreme right hand heading in the table presently appearing as "Recovery
of ABA,
percent"

(continued on page 2)

UNITED STATES PATENT OFFICE
CERTIFICATE OF CORRECTION

Patent No. 3,654,266                Dated April 4, 1972

Inventor(s) Charles A. Robinson

It is certified that error appears in the above-identified patent and that said Letters Patent are hereby corrected as shown below:

(continued from page 1)
should read

-- Recovery
of APA,
percent --.

Column 10, line 9, phenoxyacetal should read -- "phenoxyacetyl" --;

lines 62-72, the table which presently appears as follows:

"Acylating agents used:      Final penicillins obtained
   2,6-dimethoxybenzoyl chloride
   Benzene sulfonyl chloride     Methicillin.
                              6-(benzene sulfonyl amino)
   2-phenoxy propionyl chloride    penicillanic acid.
                              Phenethicillin.
   2-phenoxy butyryl chloride    Propicillin "

should read as follows:

-- | Acylating Agents Used | Final Penicillins Obtained |
|---|---|
| 2,6-dimethoxybenzoyl chloride | methicillin |
| benzene sulfonyl chloride | 6-(benzene sulfonyl amino)-penicillanic acid |
| 2-phenoxy propionyl chloride | phenethicillin |
| 2-phenoxy butyryl chloride | propicillin -- |

(continued on page 3)

UNITED STATES PATENT OFFICE
CERTIFICATE OF CORRECTION

Patent No. 3,654,266    Dated April 4, 1972

Inventor(s) Charles A. Robinson

It is certified that error appears in the above-identified patent and that said Letters Patent are hereby corrected as shown below:

(continued from page 2)

Column 11, line 30, in the formula I, (in Claim 1), the right hand portion of the bracket "A", which presently extends directly to the oxygen atom representation, "-O-", should instead extend between the oxygen and silicon atom representations designated by "-O-" and "-Si-", respectively so that the portion of the formula in question should appear as follows:

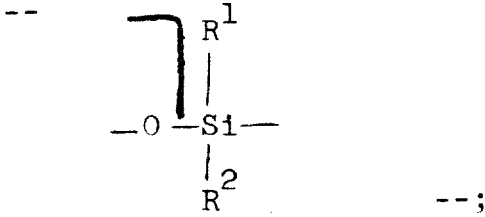

Signed and sealed this 26th day of September 1972.

(SEAL)
Attest:

EDWARD M. FLETCHER, JR.
Attesting Officer

ROBERT GOTTSCHALK
Commissioner of Patents